United States Patent
Novakovsky et al.

(10) Patent No.: US 9,684,595 B2
(45) Date of Patent: *Jun. 20, 2017

(54) ADAPTIVE HIERARCHICAL CACHE POLICY IN A MICROPROCESSOR

(71) Applicant: Intel Corporation, Santa Clara, CA (US)

(72) Inventors: Larisa Novakovsky, Haifa (IL); Joseph Nuzman, Haifa (IL); Alexander Gendler, Kiriat Motzkin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,707

(22) Filed: May 24, 2016

(65) Prior Publication Data

US 2016/0342515 A1    Nov. 24, 2016

Related U.S. Application Data

(63) Continuation of application No. 13/843,315, filed on Mar. 15, 2013, now Pat. No. 9,378,148.

(51) Int. Cl.
| | |
|---|---|
| *G06F 12/0871* | (2016.01) |
| *G06F 12/0897* | (2016.01) |
| *G06F 12/0811* | (2016.01) |
| *G06F 12/0891* | (2016.01) |
| *G06F 12/0804* | (2016.01) |
| *G06F 12/0837* | (2016.01) |
| *G06F 12/0831* | (2016.01) |

(52) U.S. Cl.
CPC ...... *G06F 12/0811* (2013.01); *G06F 12/0804* (2013.01); *G06F 12/0831* (2013.01); *G06F 12/0837* (2013.01); *G06F 12/0891* (2013.01); *G06F 2212/283* (2013.01); *G06F 2212/621* (2013.01)

(58) Field of Classification Search
None
See application file for complete search history.

(56) References Cited

U.S. PATENT DOCUMENTS

| | | |
|---|---|---|
| 5,787,478 A | 7/1998 | Hicks et al. |
| 5,909,697 A | 6/1999 | Hayes et al. |

(Continued)

OTHER PUBLICATIONS

Chen, Xiaofang, Yang, Yu, Gopalakrishnan, Ganesh, Reducing verification complexity of a multicore coherence protocol using assume/guarantee Nov. 12, 2006.

(Continued)

*Primary Examiner* — Brian Peugh
*Assistant Examiner* — Tracy Chan
(74) *Attorney, Agent, or Firm* — Trop, Pruner & Hu, P.C.

(57) ABSTRACT

A method for determining an inclusion policy includes determining a ratio of a capacity of a large cache to a capacity of a core cache in a cache subsystem of a processor and selecting an inclusive policy as the inclusion policy for the cache subsystem in response to the cache ratio exceeding an inclusion threshold. The method may further include selecting a non-inclusive policy in response to the cache ratio not exceeding the inclusion threshold and, responsive to a cache transaction resulting in a cache miss, performing an inclusion operation that invokes the inclusion policy.

19 Claims, 10 Drawing Sheets

(56) References Cited

U.S. PATENT DOCUMENTS

| | | |
|---|---|---|
| 5,926,830 A | 7/1999 | Feiste |
| 5,937,431 A | 8/1999 | Kong et al. |
| 5,963,978 A | 10/1999 | Feiste |
| 6,061,766 A | 5/2000 | Lynch et al. |
| 6,065,098 A | 5/2000 | Lippert |
| 6,076,147 A | 6/2000 | Lynch et al. |
| 6,115,794 A | 9/2000 | Arimilli |
| 6,347,363 B1 | 2/2002 | Arimilli et al. |
| 6,574,714 B2 | 6/2003 | Arimilli et al. |
| 6,662,275 B2 | 12/2003 | Arimilli et al. |
| 6,715,040 B2 | 3/2004 | Wang et al. |
| 6,721,848 B2 | 4/2004 | Gaither |
| 6,813,694 B2 | 11/2004 | Arimilli et al. |
| 6,826,654 B2 | 11/2004 | Arimilli et al. |
| 6,826,655 B2 | 11/2004 | Arimilli et al. |
| 6,901,483 B2 | 5/2005 | Robinson et al. |
| 7,032,074 B2 | 4/2006 | Gaither |
| 7,277,992 B2 | 10/2007 | Shannon et al. |
| 7,475,193 B2 | 1/2009 | Hutton et al. |
| 7,757,045 B2 | 7/2010 | Shannon et al. |
| 8,060,699 B2 | 11/2011 | Strumpen et al. |
| 8,230,176 B2 | 7/2012 | Li |
| 8,266,385 B2 | 9/2012 | Harada et al. |
| 2002/0112129 A1 | 8/2002 | Arimilli et al. |
| 2002/0129208 A1* | 9/2002 | Barroso .............. G06F 12/0826 711/141 |
| 2002/0174304 A1 | 11/2002 | Wang et al. |
| 2003/0023814 A1* | 1/2003 | Barroso .............. G06F 12/0826 711/122 |
| 2004/0030833 A1 | 2/2004 | Arimilli et al. |
| 2004/0030950 A1 | 2/2004 | Arimilli et al. |
| 2004/0059871 A1 | 3/2004 | Arimilli et al. |
| 2004/0083341 A1 | 4/2004 | Robinson et al. |
| 2004/0215901 A1 | 10/2004 | Gaither |
| 2006/0053258 A1 | 3/2006 | Liu et al. |
| 2006/0218352 A1 | 9/2006 | Shannon et al. |
| 2007/0038814 A1 | 2/2007 | Dieffenderfer et al. |
| 2007/0073974 A1 | 3/2007 | Averill et al. |
| 2007/0101058 A1* | 5/2007 | Kinnan ................ G06F 3/0605 711/114 |
| 2007/0143550 A1 | 6/2007 | Rajwar et al. |
| 2007/0186045 A1 | 8/2007 | Shannon et al. |
| 2007/0214321 A1 | 9/2007 | Shannon et al. |
| 2008/0052488 A1 | 2/2008 | Fritz et al. |
| 2008/0256306 A1 | 10/2008 | Warner et al. |
| 2009/0019306 A1 | 1/2009 | Hum et al. |
| 2010/0122035 A1 | 5/2010 | Strumpen et al. |
| 2010/0332761 A1 | 12/2010 | Li |
| 2012/0159073 A1* | 6/2012 | Jaleel .................... G06F 12/128 711/122 |
| 2012/0303898 A1 | 11/2012 | Ash et al. |
| 2012/0303904 A1 | 11/2012 | Ash et al. |
| 2012/0331213 A1 | 12/2012 | Harada et al. |
| 2013/0042070 A1 | 2/2013 | Jalal et al. |
| 2013/0042078 A1 | 2/2013 | Jalal et al. |
| 2013/0254488 A1 | 9/2013 | Kaxiras et al. |

OTHER PUBLICATIONS

Chen, Xiaofang, Verification of Hierarchical Cache Coherence Protocols for Futuristic Processors, Dec. 2008.

* cited by examiner

ADAPTIVE HIERARCHICAL CACHE POLICY IN A MICROPROCESSOR

This application is a continuation of U.S. patent application Ser. No. 13/843,315, filed Mar. 15, 2013, the content of which is hereby incorporated by reference.

TECHNICAL FIELD

Embodiments described herein generally relate to microprocessors that employ hierarchical cache architectures.

BACKGROUND

Cache memory designs often include two or more hierarchically arranged tiers of cache memories. Any two tiers of cache may comply with an inclusion policy that determines when, if ever, data stored in one of the cache tiers is redundantly stored in the other cache tier. An inclusive policy refers to a policy in which data stored in a smaller but faster tier of cache storage also resides in a larger but slower cache tier. An exclusive policy refers to a policy in which data stored in a smaller but faster tier is not stored in a larger but slower tier.

DETAILED DESCRIPTION

Figure 1A:
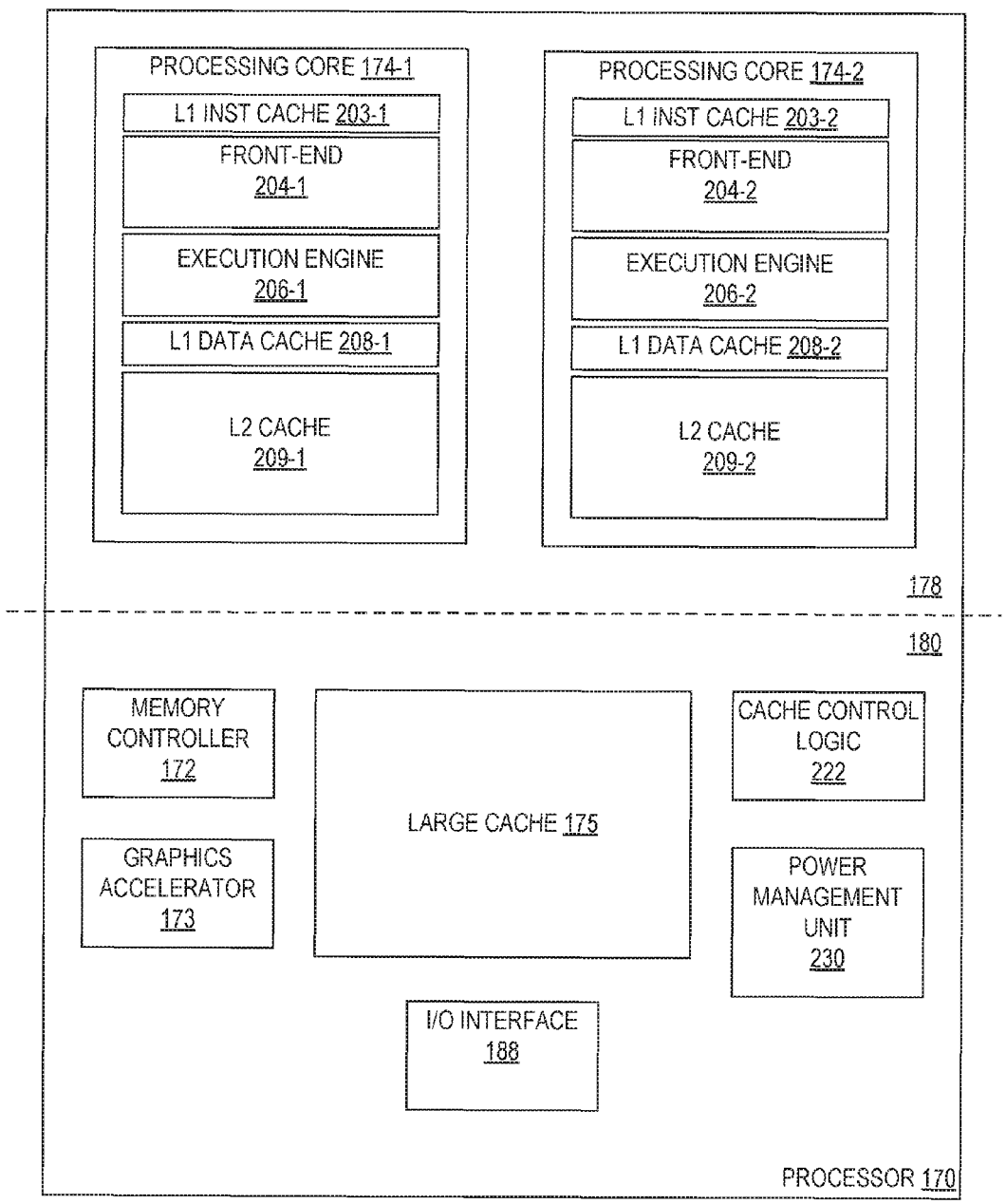
FIG. 1A illustrates a processor used in conjunction with at least one embodiment.

In at least one embodiment, a method includes determining a ratio of a capacity of a large cache to a capacity of a core cache in a cache subsystem of a processor and selecting an inclusive policy as the inclusion policy for the cache subsystem responsive to the cache ratio exceeding an inclusion threshold. The method may further include selecting a non-inclusive policy, sometimes referred to herein as a preferentially-exclusive policy, as the inclusion policy for the cache subsystem responsive to the cache ratio not exceeding the inclusion threshold. In at least one embodiment, if a clean and valid core cache line is evicted from the core cache, whether the large cache would be updated to include the line would depend on the inclusion policy via the cache ratio. In another embodiment, whether the core cache can receive a line in the modified state from the large cache would again depend on the inclusion policy via the cache ratio. In at least one embodiment, the inclusion threshold is in the range of approximately 5 to approximately 10. When the cache ratio is above 10, the large cache may be so much larger than the core cache that the duplication associated with an inclusive policy may be acceptable whereas, when the cache ratio drops below 5, the significance of the duplication cost may determine the issue in favor of a non-inclusive policy. Moreover, when the cache ratio is below 5, the number of snoop back invalidate cycles, in which a line evicted from the large cache due to a snoop transaction must then be evicted from the core cache as well, may compromise performance.

In at least one embodiment, the inclusive policy may include an inclusive eviction policy under which valid and clean lines are silently dropped in response to being evicted from the core cache and an inclusive modified line policy under which the large cache maintains ownership for modified lines and the core cache never receives modified lines from the large cache. In some embodiments, the non-inclusive policy includes a non-inclusive eviction policy under which all valid lines evicted from the core cache update the large cache and a non-inclusive modified line policy under which the large cache may provide a line to the core cache in a modified state, e.g., in response to a core cache miss that hits to a modified line in the large cache.

In some embodiments, the non-inclusive policy may include a clean data forwarding policy under which a clean line in the core cache is forwarded in response to a snoop that hits to a clean line in the core cache. The non-inclusive policy may access F-state information, in embodiments that support an F-state extension of the MESI coherency protocol, responsive to a plurality of core caches sharing valid copies of the same line. Responsive to an additional core accessing or otherwise requesting the line, the non-inclusive policy may provide the line to the requesting core from the core in which the line has the F-state in some embodiments. The non-inclusive policy may include a non-inclusive flush policy under which the large cache is updated with all valid core cache lines responsive to detection of a flush. The non-inclusive policy may, in response to the core cache owning a valid copy of a line, either clean or modified, and the large cache not owning a valid copy of the line, respond to a snoop by forwarding the cache line. In addition, in some embodiments, the non-inclusive policy may include a flush policy under which all valid core cache lines are written back or otherwise provided to the large cache.

In at least one embodiment, a processor includes a processing core that includes a core cache, a large cache, and a cache controller. In at least one embodiment, the cache controller includes an M-state unit to respond to a core cache miss of a targeted line that is valid and modified in the large cache, by performing an operation selected based on a value of a cache ratio indicator. The cache ratio indicator, referred to herein as the inclusion threshold, indicates whether a ratio of a size of the large cache to a size of the core cache exceeds a threshold value.

In at least one embodiment, the operation performed by the M-state unit is selected from a first inclusive modified operation and a first non-inclusive modified operation. The first inclusive modified operation may include allocating a core cache line to store the targeted line in an exclusive state and filling the core cache line from the line in the large cache. The first non-inclusive modified operation may include allocating a core cache line to store the targeted line in a modified state, forwarding the line in the large cache to the core cache, and invalidating the line in the large cache.

In some embodiments, the cache controller includes a core eviction unit to respond to an eviction of a clean and valid line from the core cache by performing an operation selected based on a value of the cache ratio indicator. The selected operation may include an inclusive eviction operation comprising silently dropping the cache line from the core cache and a non-inclusive eviction operation comprising updating the large cache to include the cache line.

In at least one embodiment, the M-state unit may be operable to respond to a read for ownership (RFO) snoop request by either disregarding the snoop request when the cache ratio is large, i.e., greater than the threshold, or by accessing a tracking structure and providing a line applicable to the snoop request responsive to detecting an indication of the line in the tracking structure when the cache ratio is small.

The cache controller may include a snoop unit to respond to a passive read snoop request that hits to a clean and valid line in the core cache by acknowledging the snoop request when the cache ratio is large or by updating the large cache to include the clean and valid line indicated in the snoop request when the cache ratio is small.

In some embodiments, the processing core includes a plurality of core caches including a first core cache. In at least one of these multicore embodiments, the large cache is shared with respect to each of the plurality of core caches. In these embodiments, the cache controller may include an F-state unit to respond to a forward request from a second core cache by forwarding the requested line from the first core cache responsive to the line having a forward coherency state (F-state) in the first core cache or by forwarding the line from another core cache responsive to the line having a shared coherency state in the first core cache.

In at least one embodiment, the cache controller includes a core flush unit to respond to a core flush instruction by performing an operation selected, based on a value of the cache ratio indicator, from a non-inclusive flush operation that includes updating the large cache to include all valid lines in the core cache and an inclusive flush operation that includes updating the large cache to include all modified lines in the core cache.

In at least one embodiment, the processing core includes a level one instruction cache, a level one data cache, an intermediate level or L2 cache, and a last level, L3, or large cache, which may also be a shared cache in a multi-core embodiment. In these embodiments, references to the "core cache" may refer to the L2 cache and references to the "large cache" may refer to the last level cache. In some embodiments, references to the "core cache" may refer to the level one data cache or the level one instruction cache and references to the "large cache" may refer to the L2 cache. In some embodiments, the determination of non-inclusive versus inclusive is made both with respect to inclusion between the L1 cache and the intermediate cache and with respect to inclusion between the last level cache and the intermediate cache as well.

In at least one embodiment, the processor includes a plurality of processing cores, each of which includes a core cache. In these multi-core embodiments, the large cache may be a shared cache that is shared by each of the core caches.

In at least one embodiment, a cache control method includes determining a cache ratio of a capacity of a large cache to a capacity of a core cache in a cache subsystem of a processor and performing, responsive to a cache transaction resulting in a cache miss, an operation that is selected based on a value of the cache ratio. In at least one embodiment, the operation is selected from an inclusive operation that preserves inclusivity between the core cache and the large cache and a non-inclusive operation that preserves non-inclusivity between the core cache and the large cache.

Performing the operation may include performing the inclusive operation responsive to the cache ratio being less than a predetermined threshold value. In at least one embodiment, the predetermined threshold value is in the range of approximately 5 to approximately 10. In some embodiments, the inclusive operation may include silently dropping clean lines evicted from the core cache or preventing a line in the core cache from being allocated in the modified state.

In some embodiments performing the operation includes performing the non-inclusive operation responsive to the cache ratio being less than a predetermined threshold value. The non-inclusive operation may be an operation selected from a group of non-inclusive operations that includes: updating the large cache to include modified lines and clean lines evicted from the core cache based on the cache ratio not exceeding the predetermined threshold value, allocating a line in the core cache in a modified state based on the cache ratio not exceeding the predetermined threshold value, or providing a modified line in the core cache in response to a snoop transaction that hits to the modified line.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

FIG. 1A illustrates a processor used in conjunction with at least one embodiment. In at least one embodiment, processor 170 includes a core region 178 and an integration region 180. In some embodiments, core region 178 includes processing cores 174-1 and 174-2. Other embodiments of processor 170 may include more or fewer processing cores 174.

In some embodiments, each processing core 174 includes a level 1 (L1) instruction cache 203, a front-end 204, an execution engine 206, an L1 data cache 208, and a level 2 (L2) cache 209. Front-end 204 may, in some embodiments, monitor an instruction pointer and, based on predictions regarding program flow, fetch or prefetch instructions from L1 instruction cache 203. In at least one embodiment, front-end 204 may also schedule, select, and issue instructions to execution engine 206. In some embodiments, execution engine 206 may include one or more execution pipelines (not depicted) including any one or more of arithmetic logic unit pipelines, floating point pipelines, branch pipelines, and load/store pipelines. In at least one embodiment, pipelines in execution engine 206 include one or more stages to decode an instruction, perform an operation indicated by the instruction and/or execute micro code corresponding to the instruction to produce a result, and store the result to a register. In some embodiments, execution engine 206 includes a register file that may support register renaming, speculative execution, and out-of-order execution of instructions.

In at least one embodiment, region 180 includes a large cache 175 and cache control logic 222. In this embodiment, large cache 175 is a shared resource for all of processing cores 174 of processor 170. In some embodiments, large cache 175 represents, from the perspective of processor 170, the last available hierarchical tier of cache memory and, in these embodiments, may be referred to as the last level cache (LLC). In these embodiments, if a memory access instruction presented to large cache 175 contains a memory address or tag that misses in the cache, the requested data must be retrieved from system memory (not depicted in FIG. 1A).

In some embodiments, processing core 174 and/or integration region 180 including one or more levels of a cache hierarchy between core caches 203, 208 and large cache 175 are included. Processing core 174 may include, in some embodiments, an intermediate tier cache memory hierarchically (not shown) located between core caches 203, 208 and large cache 175. Each of the cache memories of processing core 174 may have a unique architectural configuration. In at least one embodiment, L1 data cache 208 and large cache 175 are both multiple-way, set associative caches. In some embodiments, large cache 175 is inclusive with respect to L1 data cache 208 while, in other embodiments, large cache 175 may be non-inclusive with respect to L1 data cache 208.

In at least one embodiment, cache control logic 222 controls access to the cache memories, enforces a coherency policy, implements an inclusion policy between the two caches, implements an eviction policy for each cache, and monitors memory access requests from external agents, e.g., other processors 170 or I/O devices. In at least one embodiment, large cache 175 and core caches 203, 208 comply with an MESI protocol or a modified MESI protocol. The four states of the MESI protocol are described in Table 1.

TABLE 1

| MESI State | Description |
| --- | --- |
| MODIFIED | The cache line contains valid data that is modified from the system memory copy of the data. Also referred to as a 'dirty' line. |
| EXCLUSIVE | The line contains valid data that is the same as the system memory copy of the data. Also indicates that no other cache has a line allocated to this same system memory address. Also referred to as a 'clean' line. |
| SHARED | The line contains valid and clean data, but one or more other caches have a line allocated to this same system memory address. |
| INVALID | The line is not currently allocated and is available for storing a new entry. |

A modified MESI protocol could, in one embodiment, include an additional state, the "F" state, identifying one of a plurality of "S" state lines, where the "F" state line is designated as the line to forward the applicable data should an additional request for the data be received, e.g., from a processor that does not have the data.

In some embodiments, integration region 180 of processor 170 also includes power management unit 230 to control power provided to the various resources of processor 170. In some embodiments, power management unit 230 provides unique power supply levels to core region 178 and integration region 180. In other embodiments, power management unit 230 may be further operable to provide unique power supply levels to each processing core 174 and/or provide clock signals at unique frequencies to processing cores 174. In addition, power management unit 230 may implement various power states for processor 170 and define events that produce power state transitions in some embodiments.

In at least one embodiment, integration region 180 includes graphics accelerator 173 to support low latency, high bandwidth communication with a display device (not depicted). While in some embodiments memory controller 172 and graphics accelerator 173 are integrated into processor 170, other embodiments may implement one or both of these functions in a chipset device.

In some embodiments, integration region 180 includes an I/O interface 188 to support communication with one or more chipset devices, discreet bus interfaces, and/or individual I/O devices. In some embodiments, I/O interface 188 provides one or more point-to-point interfaces. In other embodiments, I/O interface 188 may provide an interface to a shared bus to which one or more other processors 170 may also connect.

Figure 1B:
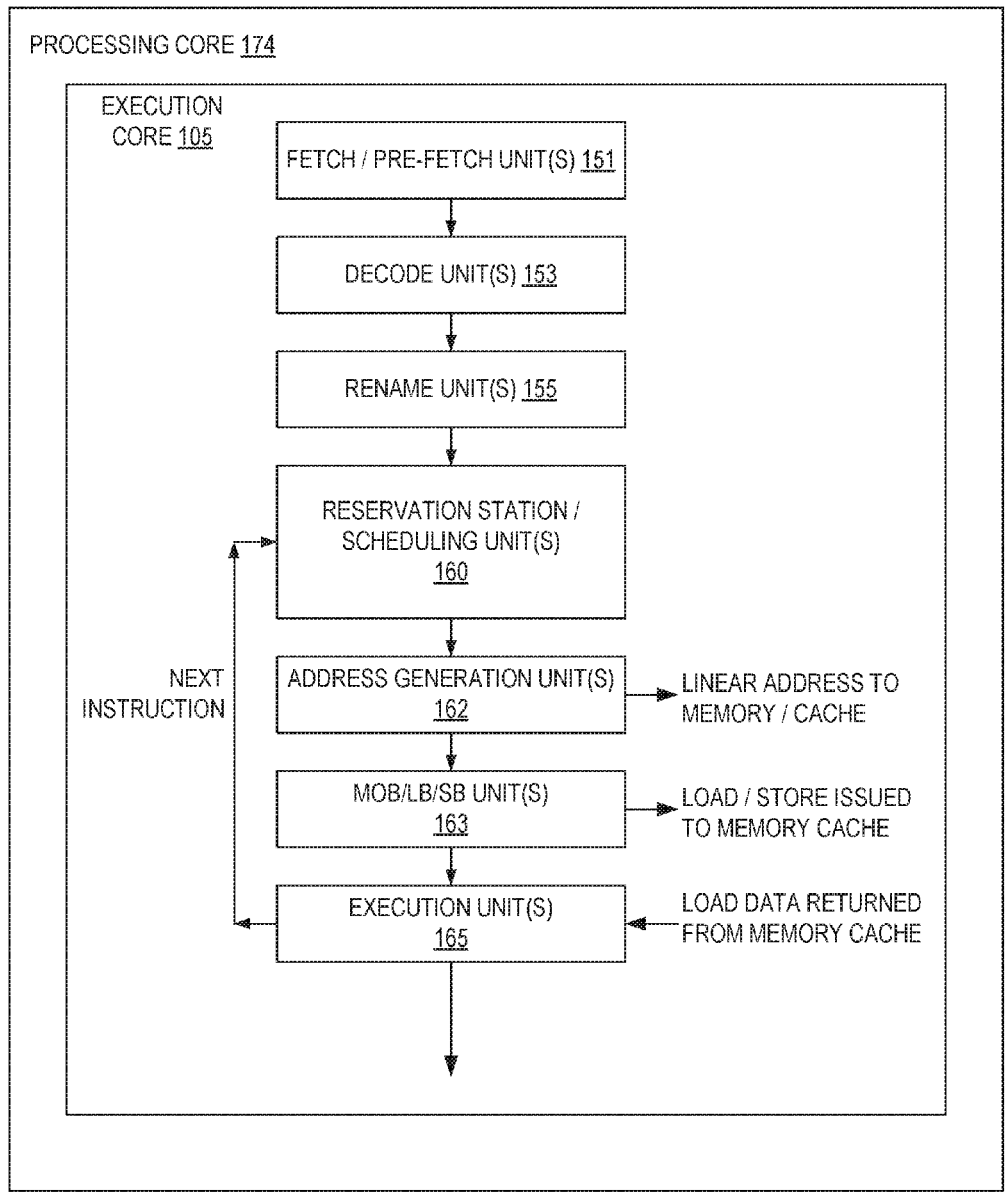
FIG. 1B illustrates a processor used in conjunction with at least one embodiment.

FIG. 1B illustrates an out-of-order execution core. In one embodiment, execution core 105 includes all or some of the elements of front end 204 and execution engine 206 of processing core 174. In at least one embodiment, pending loads may be speculatively issued to a memory address before other older pending store operations according to a prediction algorithm, such as a hashing function. In at least one embodiment, execution core 105 includes a fetch/prefetch unit 151, a decoder unit 153, one or more rename units 155 to assign registers to appropriate instructions or micro-ops, and one or more scheduling/reservation station units 160 to store micro-ops corresponding to load and store operations (e.g., STA micro-ops) until their corresponding target addresses source operands are determined. In some embodiments an address generation unit 162 to generate the target linear addresses corresponding to the load and stores, and an execution unit 165 to generate a pointer to the next operation to be dispatched from the scheduler/reservation stations 160 based on load data returned by dispatching load operations to memory/cache are also included. In at least one embodiment, a memory order buffer (MOB) 163, which may contain load and store buffers to store loads and stores in program order and to check for dependencies/conflicts between the loads and stores is included. In one embodiment, loads may be issued to memory/cache before older stores are issued to memory/cache without waiting to determine whether the loads are dependent upon or otherwise conflict with older pending stores. In other embodiments, processor 170 is an in-order processor.

Figure 2:
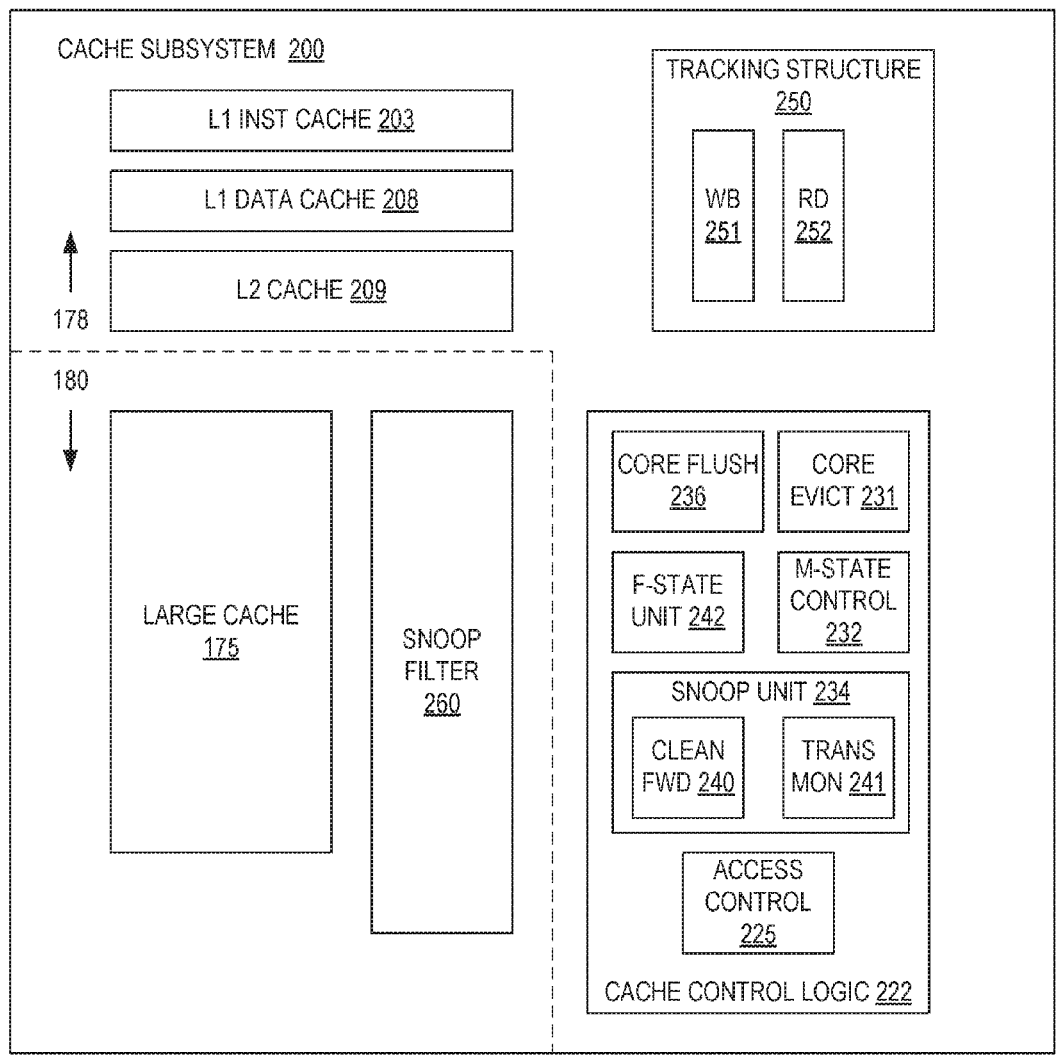
FIG. 2 illustrates a cache subsystem used in conjunction with at least one embodiment.

FIG. 2 illustrates a cache subsystem used in conjunction with at least one embodiment suitable for implementing a flexible inclusion policy in a cache subsystem. In at least one embodiment, cache subsystem 200 includes, apart from L1 data cache 208 and large cache 175, cache control logic 222, snoop filter 260, and tracking structure 250. In some embodiments, cache control logic 222 includes a number of elements that differentiate the manner in which they process transactions depending upon a cache ratio of the cache subsystem. In at least one embodiment, cache control logic 222 is located within core region 180. All or some of the elements of cache control logic may be in core region 180 or integration region 178 in various embodiments. In at least one embodiment, the cache ratio refers to the ratio of a capacity of large cache 175 to a capacity of L2 cache 209. In other embodiments, the ratio and the inclusion policy determination may apply between L2 cache 209 as the large cache and either of the L1 data caches 208 and/or 203 as the core cache. In some embodiments, the ratio and the inclusion policy may apply with respect to the large cache 175/L2 cache 209 ratio and to the L2 cache 209/L1 data cache 208, 203 ratio as well. In at least one embodiment in which the large cache/L2 cache ratio is large and the L2/L1 ratio is small, different inclusion policies may apply between the different pairs of caches. Generally, when the cache ratio exceeds an inclusion threshold, e.g., a ratio in the range of approximately 5 to 10, the large cache 175 is significantly larger than L2 cache 209 and an inclusive policy may be suitably implemented in some embodiments. If, however, the cache ratio is less than or equal to the inclusion threshold, embodiments of the cache subsystem may implement a non-inclusive policy. For purposes of this disclosure, a non-inclusive policy refers to an inclusion policy that is preferentially, but not strictly exclusive, e.g., the non-inclusive policy may recognize exceptions that a fully exclusive policy would support. In this context, an exclusive policy refers to a policy in which no cache line is valid in both caches.

In at least one embodiment, cache control logic 222 including a snoop unit 234, an M-state control unit 232, a core evict unit 231, and a core flush unit 236 are included. In some embodiments, Cache control logic 222 also includes access control 225, which provides a central point for coherency and may enforce compliance with, in addition to an inclusion policy, a cache coherency policy and an eviction policy. In some embodiments, tracking structure 250 includes buffers recording unfulfilled cache operations including cache updates that occur in response to write back and read/RFO requests. Snoop filter 260, in some embodiments, includes any data structure suitable for indicating all lines that are valid in the cache subsystem. In at least one embodiment, snoop unit 234 further include features including a clean forward unit 240 and a transition monitor 241.

In some embodiments, each of the units of cache control logic 222 emphasizes a functionality under which cache control logic 222 differentiates its behavior depending upon whether the cache ratio indicates inclusive protocol or non-inclusive protocol is preferable. Other embodiments may differentiate upon more or fewer features.

In at least one embodiment, core evict unit 231 manages evictions of lines allocated in L2 cache 209. In some embodiments, when the cache ratio indicates an inclusive protocol, large cache 175 always has a copy of a line that resides in L2 cache 209. Accordingly, L2 cache 209 and cache control logic 222 can, in some embodiments, perform an eviction by simply dropping the line from the L2 cache 209, a process sometimes referred to as a silent drop. In at least one embodiment, core evict unit 231 supports a silent drop of any line that is valid and unmodified, i.e., any line that is in the E-State or the S-State.

In some embodiments, if the cache ratio indicates an inclusive policy, core evict unit 231 will perform a silent line drop unless the core cache line being evicted is in the M-state. In at least one embodiment, under an inclusive policy, L2 cache 209 can only become modified in response to a write access from the local processor.

Responsive to the cache ratio indicating an inclusive policy, core evict unit 231 will, in some embodiments, update the large cache 175 in response to evicting a modified or M-state line from L2 cache 209. In at least one embodiment, the updating of the large cache 175 responsive to evicting a modified line from L2 cache 209 generates an entry in tracking structure 250. More specifically, in some embodiments, tracking structure 250 includes a write back buffer 251 and a read/RFO buffer 252. In the case of updating the large cache 175 with a modified line evicted from L2 cache 209, an entry in write back buffer 251 may, in some embodiments, be created during the pendency of the update.

In at least one embodiment, if the cache ratio indicates a non-inclusive policy, core evict unit 231 may process an eviction from L2 cache 209 differently than when the cache ratio indicates an inclusive policy. In some embodiments, for a non-inclusive policy, the preference is to store data in either L2 cache 209 or large cache 175, but not both. Thus, in some embodiments, under a non-inclusive policy, the valid lines in L2 cache 209 are not valid in large cache 175, i.e., L2 cache 209 is the only cached source of the data. To prevent loss of data from cache subsystem 200 in its entirety, at least one embodiment of core evict unit 231 will, under a non-inclusive policy, update large cache 175 as a part of the eviction of any valid data from L2 cache 209. In some embodiments, the updating of large cache 175 with a non-modified line being evicted from L2 cache 209 may generate an entry in write back buffer 251 of tracking structure 250 even though the updating of large cache 175 that occurs in this case is not a traditional write back of modified data. Thus, in some embodiments, under the noninclusive policy, the write back and read buffers in tracking structure 250 are indicators of the direction of cache updates rather than the type of those updates. In at least one embodiment, write backs refer to updates proceeding from the L2 cache 209 to the large cache 175 while read requests in read/RFO buffer 252 refer to updates in which data flows from large cache 175 to L2 cache 209.

In at least one embodiment, cache control logic 222 includes M-state control unit 232. M-state control unit 232 may be responsible for managing state data residing in L2 cache 209. More specifically, under an inclusive policy, large cache 175 is, in some embodiments, solely responsible for modified data globally, i.e., with respect to external agents including other cores and input/output devices. Thus, in some embodiments, in an inclusive policy, L2 cache 209 may never receive data in a modified state but can, instead, only receive data in an exclusive or shared state. In at least one embodiment, under an inclusive policy, a line in L2 cache 209 can become modified only through operation of an access from the applicable processor.

Thus, in some embodiments, under an inclusive policy, M-state control unit 232 need only monitor for evictions of modified lines from L2 cache 209, discussed previously, and monitor for updating write back buffer 251 in tracking structure 250 during the pendency of the write back. Handling of snoop requests that hit to a modified line in L2 cache 209 are discussed below with respect to snoop unit 234.

In at least one embodiment, when a non-inclusive policy is indicated, M-state control unit 232 must support the ability of L2 cache 209 to receive any line in a modified state. In one embodiment, if a modified line in large cache 175 is associated with a tag that Misses in L2 cache 209, L2 cache 209 may generate a line Fill request that hits to the modified line in large cache 175. Rather than incur the latency penalty associated with writing back the data from large cache 175 to system memory, at least one embodiment of M-state control unit 232 will initiate a line Fill for L2 cache 209 of a modified line from large cache 175.

Responsive to M-state control unit 232 initiating a line fill for L2 cache 209 using a modified line in large cache 175, tracking structure 250 is updated to reflect a read or read/RFO in read/RFO buffer 252 in one embodiment.

In some embodiments, an implication of implementing a non-inclusive policy is that transitions that affect the core cache include both read requests buffered in read/RFO buffer 252 as well as write back requests buffered in write back buffer 251. The snoop unit 234, in some embodiments, must, therefore, monitor both buffers in tracking structure 250 when processing an incoming snoop. In at least one embodiment, M-state control unit 232 is also operable to detect a lack of functionality in the L2 cache 209. In at least one embodiment, anytime cache control logic 222 determines an inability to store data to L2 cache 209, M-state control unit 232 must immediately evict modified data to large cache 175 to prevent data loss.

As referenced previously, in some embodiments, cache control logic 222 includes snoop unit 234. In at least one embodiment, snoop unit 234 includes at least two functional blocks that provide differentiated behavior depending upon the cache ratio. In some embodiments snoop unit 234 includes a clean forward unit 240 and a transition monitor 241. The transition monitor 241 may, in some embodiments, be responsible for ensuring proper handling of a snoop that arrives while any updates between the L2 cache 209 and large cache 175 are in progress. In this case, in some embodiments, the transition monitor 241 must ensure that the snoop is provided with the line by tracking structure 250. If the transaction is a write back of core cache modified data or exclusive data, as discussed previously, to large cache 175, write back buffer 251 in tracking structure 250 should, in some embodiments, include a reference to this transaction. Similarly, in some embodiments, if a fill is in progress transferring a clean or modified line from large cache 175 to L2 cache 209, read/RFO buffer 252 in tracking structure 250 should include an entry that permits transition monitor 241 to recognize the transaction and provide it to any snooping agent.

In at least one embodiment, with respect to an inclusive policy, transition monitor 241 need only be concerned with write back buffer 251 of tracking structure 250 because as discussed previously, under an inclusive policy, an external agent will acquire the data from large cache 175 unless L2 cache 209 has modified the line copy. In some embodiments, if L2 cache 209 has a modified line under an inclusive policy, and a snoop to the modified line is received, L2 cache 209 initiates a write back to large cache 175 and posts the write back in tracking structure 250 within write back buffer 251.

In some embodiments, clean forwarding unit 240 represents a part of snoop unit 234 that recognizes snoop requests that hit to a line in L2 cache 209. In at least one embodiment, when a hit to a line on L2 cache 209 occurs under an inconclusive policy and the line in L2 cache 209 is a valid and clean line, no forwarding of the data is required because the large cache 175 already contains a copy of the data. If, on the other hand, the line in L2 cache 209 is modified, the forwarding unit 240 will, in some embodiments, forward the modified line to large cache 175.

In at least one embodiment, with respect to a noninclusive policy, however, clean forwarding unit 240 may be required to forward clean data in response to a snoop that hits to a clean line in L2 cache 209.

In some embodiments, cache control logic 222 further includes a core flush unit 236. In at least one embodiment, core flush unit 236 behaves differently for inclusive versus noninclusive policies. In at least one embodiment, in an inclusive policy, in which all valid and clean data is replicated in large cache 175, a core flush needs only to write back the modified lines because the large cache contains the data.

In at least one embodiment, for a non-inclusive policy, however, core flush unit 236 must write back or otherwise provide all valid lines to the large cache. In at least one embodiment, cache control logic 222 may further include an F-State unit 242. In some embodiments, the F-state of a line indicates the core that is designated to forward a line shared by multiple cores in response to an additional core requesting the data. In some embodiments, in the case of a non-inclusive policy, a line may be valid and shared among multiple processing cores 174. In at least one embodiment, if a subsequent processing core 174 requests the data, the use of the F-state can resolve any contention among the processors as to who will forward the line.

Figure 3:
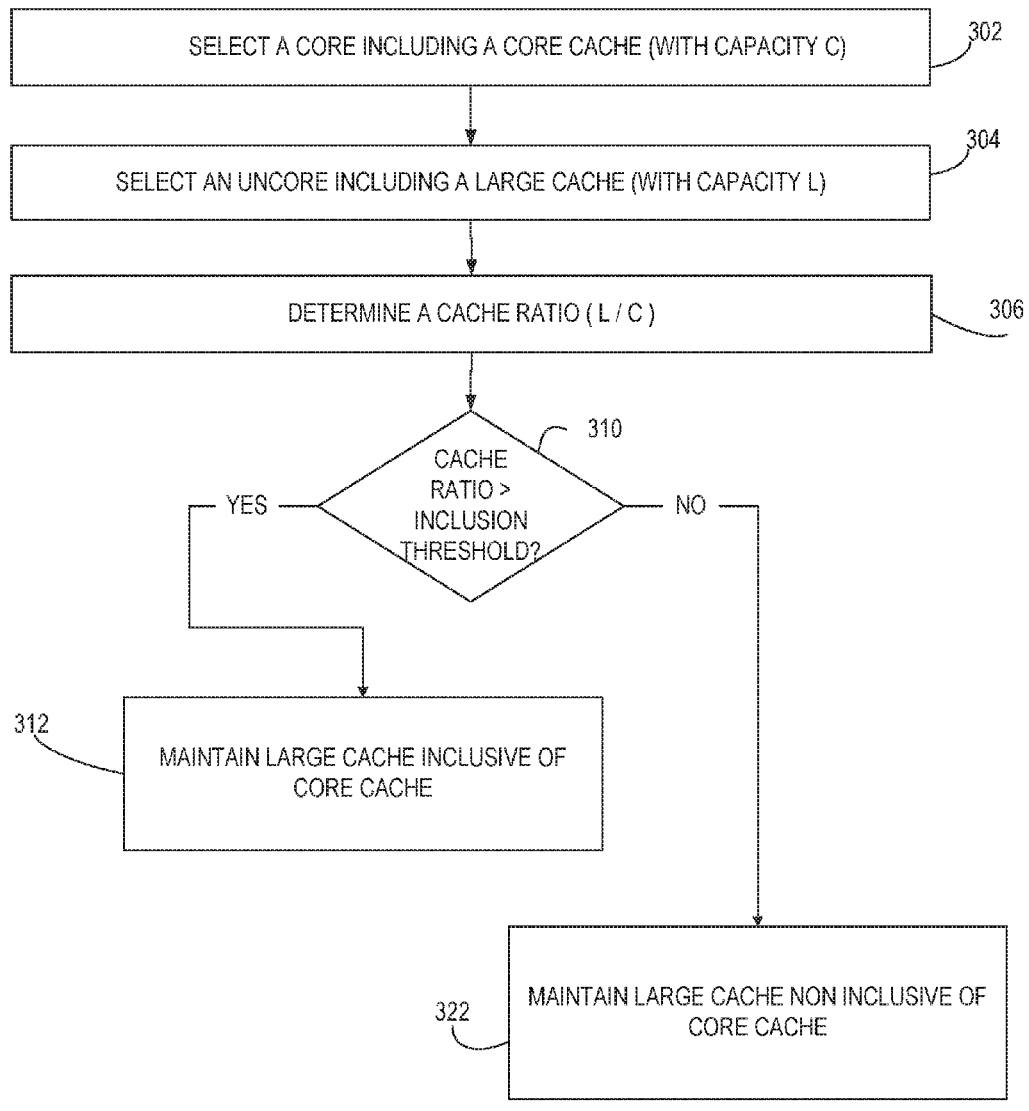
FIG. 3 illustrates one embodiment of a design method.

At least one embodiment may be implemented as a design methodology for designing a processor and processor system. FIG. 3 illustrates one embodiment of a design method. In at least one embodiment, method 300 includes selecting (operation 302) a core including a core cache. In some embodiments, selection of a core may involve selection of a standardized core that has been developed and is available as a standard cell. In some embodiments, method 300 further includes selecting (operation 304) an integration region or uncore region that includes a large cache such as a large cache 175 discussed previously. In at least one embodiment, method 300 includes determining a cache ratio of a capacity of a large cache to a capacity of a core cache (operation 306).

In some embodiments, method 300 further includes determining (operation 310) whether a cache ratio of the processor exceeds an inclusion threshold. Although the inclusion threshold value may vary in different embodiments, at least one embodiment selects an inclusion threshold of approximately 5 to 10. In some embodiments, if the cache ratio is greater than the inclusion threshold, the large cache is substantially larger than the core cache and an inclusive policy may be preferable as illustrated by reference 312.

In at least one embodiment, if the cache ratio is greater than the inclusion threshold, an inclusive policy is invoked in operation 312. In some embodiments, if the cache ratio is not greater than the inclusion threshold, method 300 proceeds to block 322 and invokes non-inclusive policies for the cache subsystem.

Figure 4:
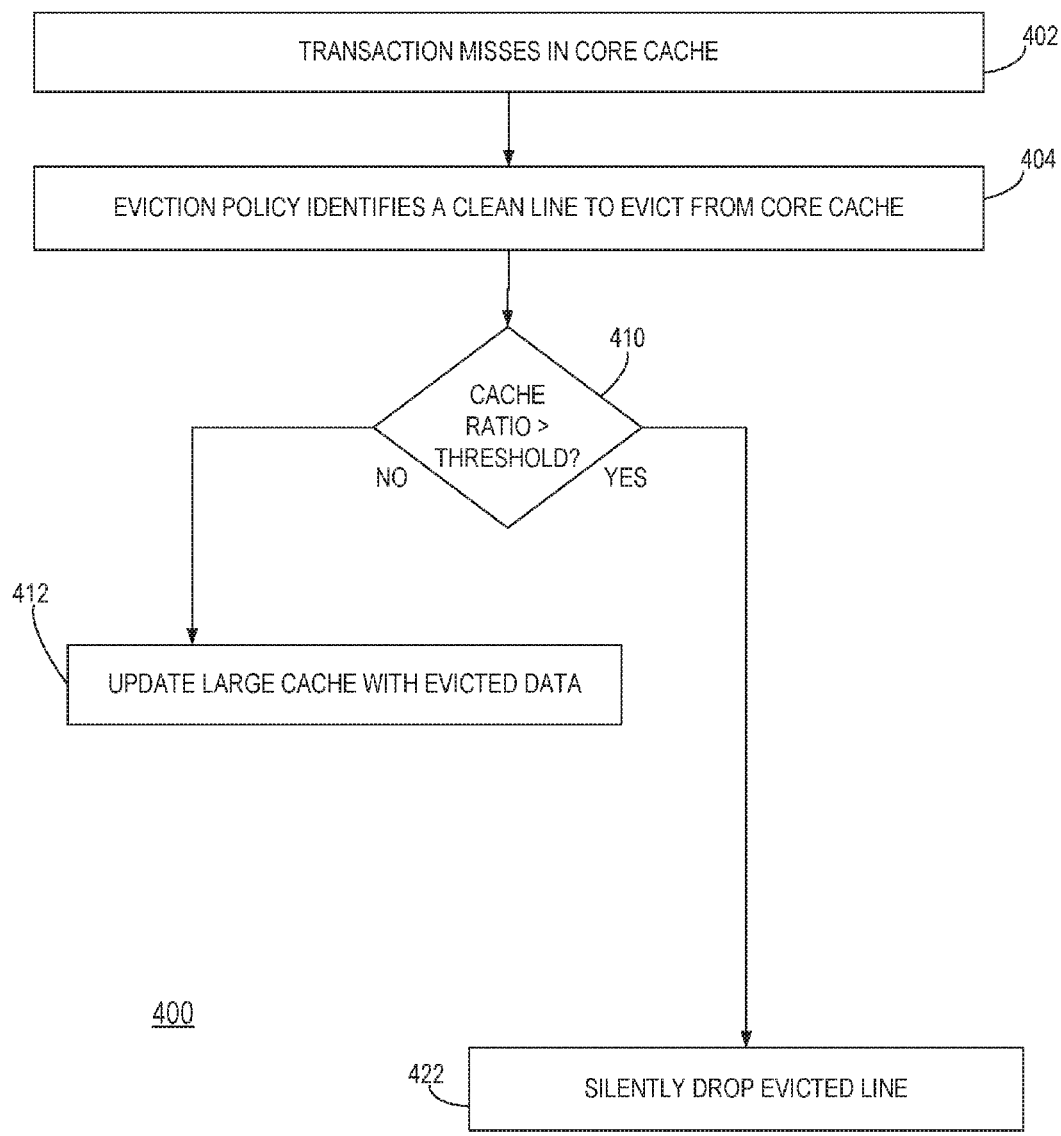
FIG. 4 illustrates one embodiment a cache line eviction method.

FIG. 4 illustrates one embodiment a cache line eviction method. In at least one embodiment, processor 170 includes operation 402 in which a memory access transaction misses in the core cache. In some embodiments, assuming the core cache is fully occupied, an eviction policy is invoked to identify (operation 404) a line to evict. In at least one embodiment, the line identified for an eviction is a clean line. In some embodiments, based upon whether the cache ratio exceeds the inclusion threshold, method 400 may perform either of two operations. If the cache ratio is greater than the inclusion threshold (operation 410), an inclusive policy is indicated and method 400 silently drops the evicted line (operation 422). Silently dropping an evicted line is an efficient way to evict a line in response to the line data being available from another source. If the cache ratio is greater than the inclusion threshold, a non-inclusive policy is indicated and method 400 includes updating (block 412) a large cache with evicted data.

Figure 5:
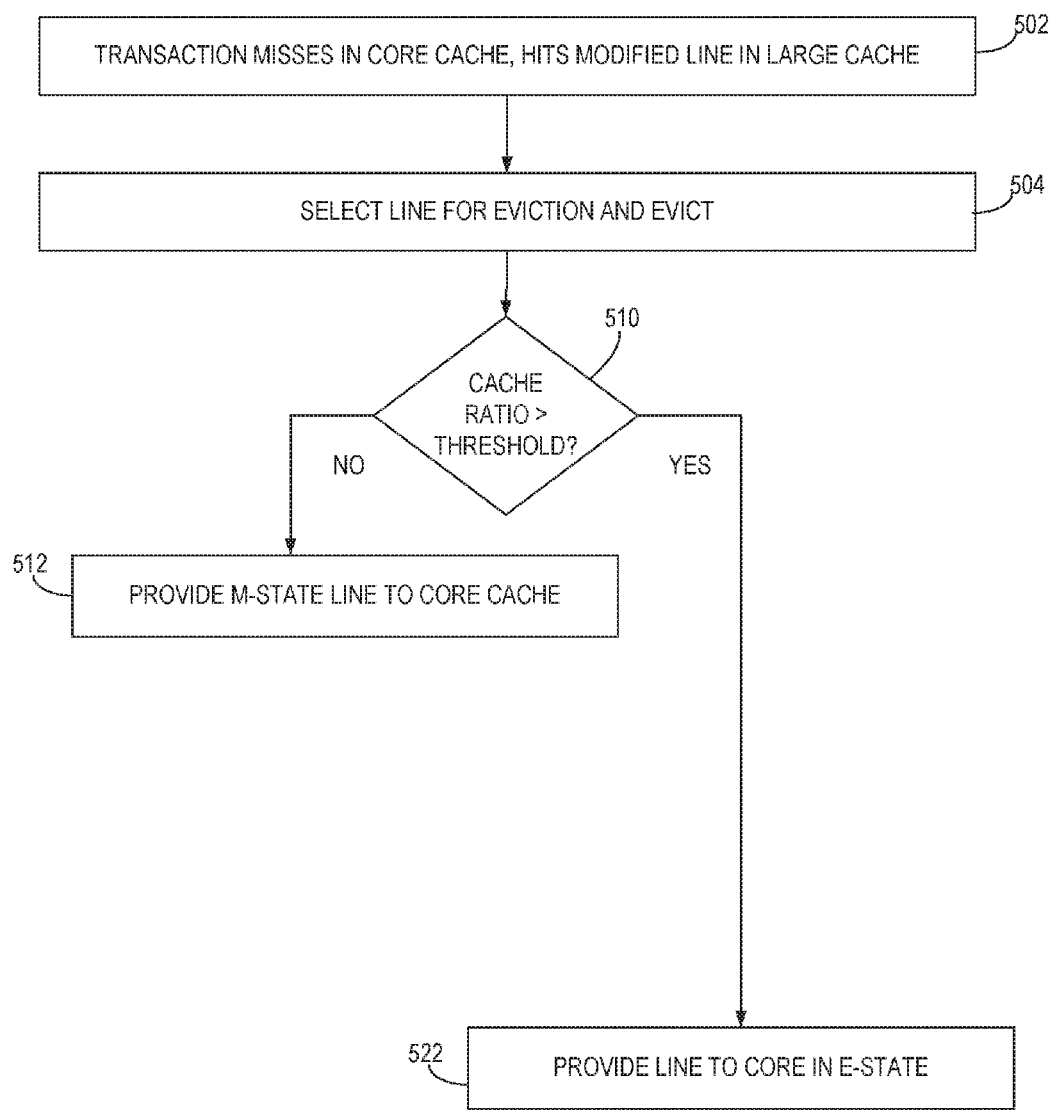
FIG. 5 illustrates one embodiment of a cache memory update method.

FIG. 5 illustrates one embodiment of a cache memory update method. Method 500 shows functionality illustrating behavior of processor 170 responsive to a transaction or memory access request missing in the core cache but hitting to a modified line in the large cache (operation 502). In at least one embodiment, method 500 includes selecting (operation 504) a line for eviction and the selected line is then evicted according to the process described above with respect to FIG. 4. In some embodiments, if an inclusive policy is indicated by a cache ratio exceeding the inclusion threshold (operation 510), method 500 proceeds to operation 522 and provides the line from the large cache to the core in the E-state. In some embodiments, if a non-inclusive policy is indicated, the modified line is provided to the core cache in operation 512. In at least one embodiment, the modified line is removed from the large cache and is found only in the core cache. In some alternative embodiments, providing the modified line to the core cache could be accompanied by changing the state of the large cache line to exclusive. In some embodiments, this implementation might be beneficial in an application with a particularly high reliability requirement. In this case, in some embodiments, reliability is improved or vulnerability to soft errors is reduced by maintaining a backup copy of the modified data.

Figure 6:
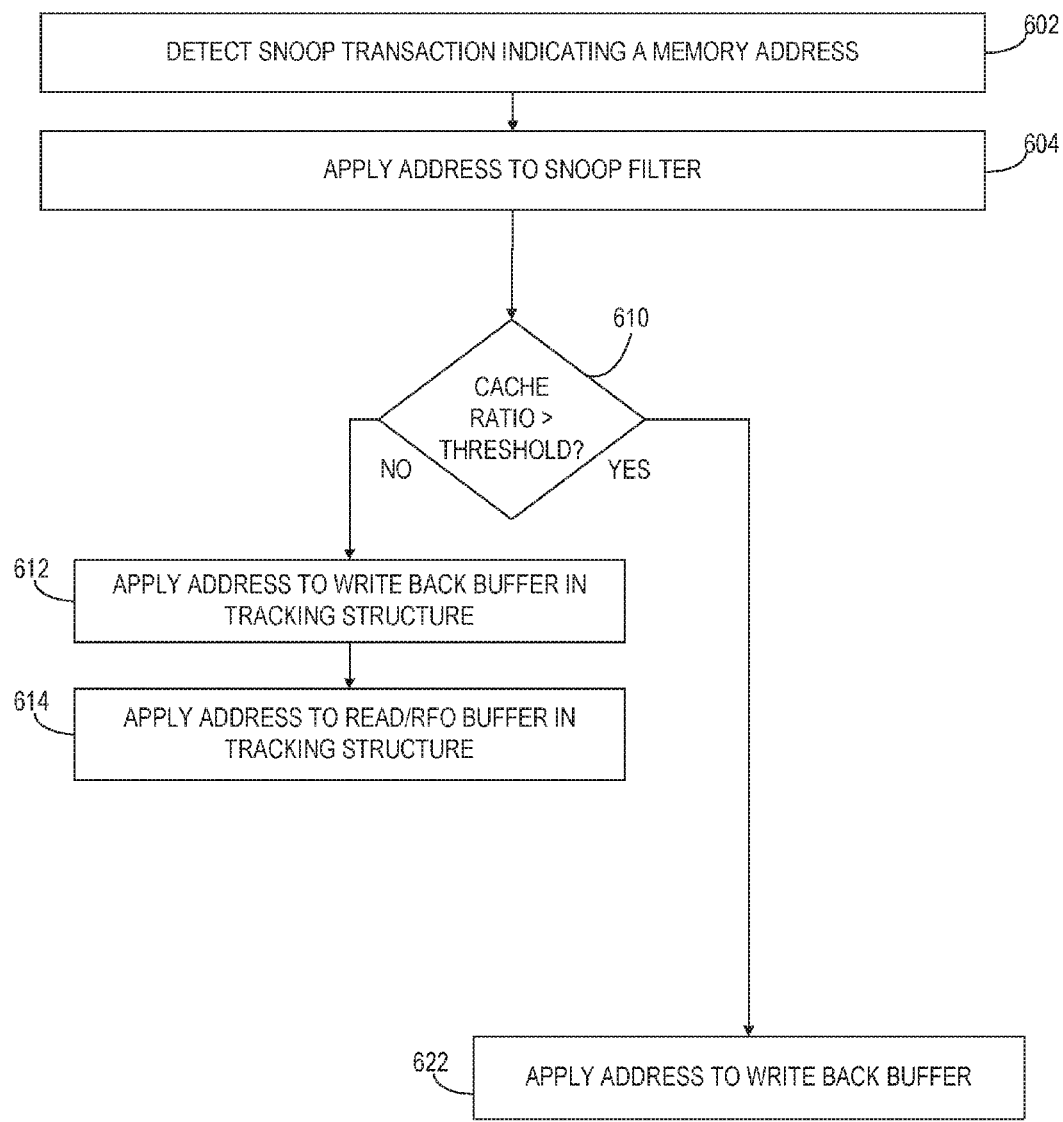
FIG. 6 illustrates one embodiment of processing a snoop transaction.

FIG. 6 illustrates one embodiment of processing a snoop transaction. Method 600 illustrates functionality of cache control logic 222 (FIG. 2) responsive to a snoop transaction being detected (operation 602). In one embodiment, method 600 includes providing an address associated with the snoop transaction to a snoop filter (operation 604). In some embodiments, assuming the snoop filter did not indicate the presence of the snoop address, the line may still be in the cache subsystem within a transitional structure including tracking structure 250 (FIG. 2). In some embodiments, if the cache ratio is greater than the inclusion threshold (operation 610), an inclusive policy is indicated and it is therefore only necessary for the snoop controller to check the write back buffer 251. In some embodiments, if the cache ratio is not greater than the inclusion threshold, a non-inclusive policy is indicated and method 600 includes checking (operation 612) the write back buffer 251 as well as checking (operation 614) the read/RFO buffer 252. If the tracking structure includes a reference to the line indicating that the line is in transition between the core cache and the large cache, the snoop unit may, in some embodiments, obtain and provide the line in response to the snoop (operation 622).

Figure 7:
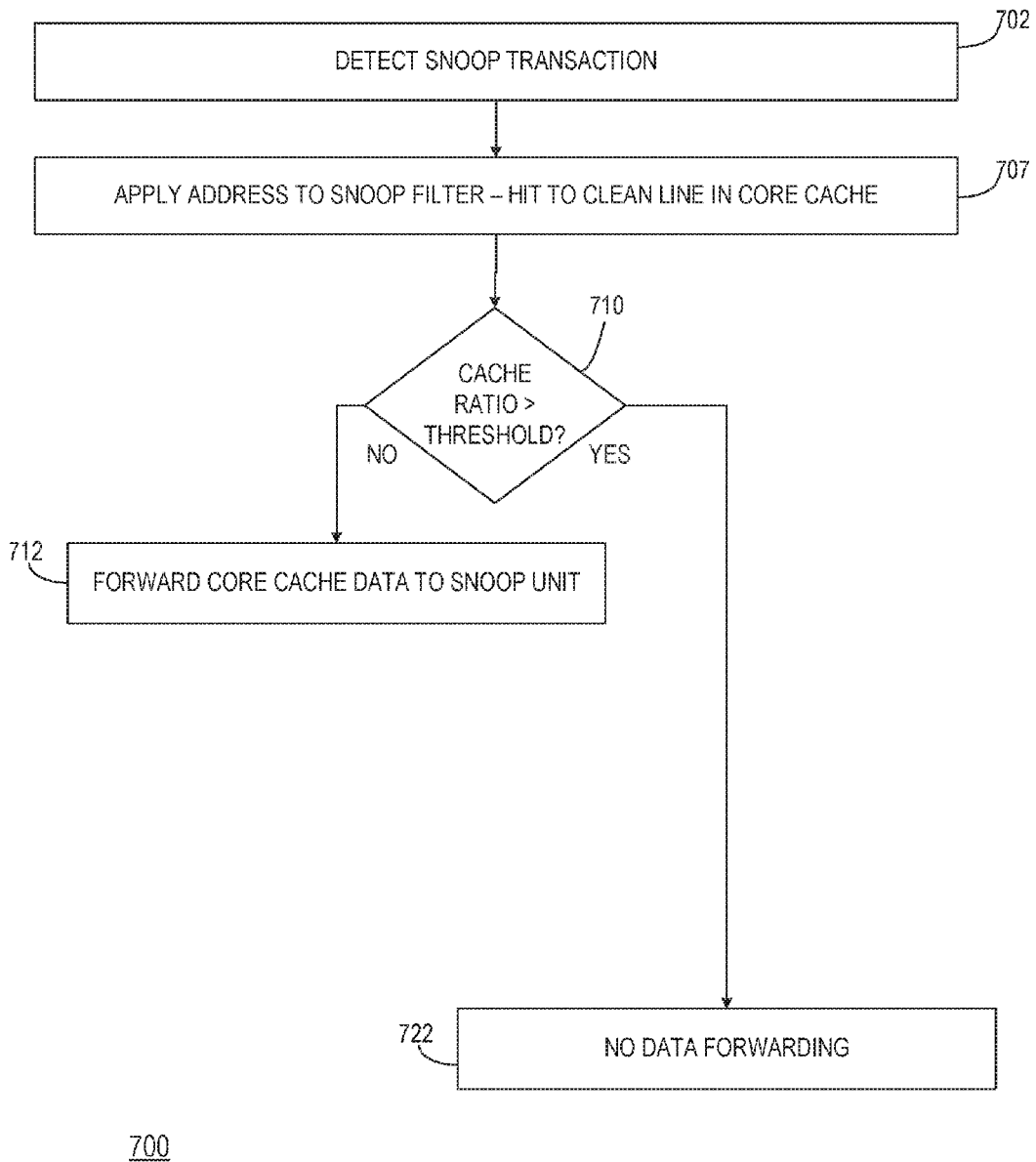
FIG. 7 illustrates one embodiment of a data forwarding method.

FIG. 7 illustrates one embodiment of a data forwarding method. Method 700 illustrates functionality of a core cache subsystem detecting (operation 702) a snoop transaction. In at least one embodiment, the address is presented to a snoop filter, which indicates that a clean copy of the line is resident in the core cache (operation 704). In some embodiments, if the cache ratio is greater than the inclusion threshold (operation 710), method 700 does not forward the core cache data at operation 722 because the data is already resident in the large cache. In some embodiments, if, on the other hand, the cache ratio is not greater than the inclusion threshold and the inclusion policy is, therefore, non-inclusive, method 700 forwards the clean copy of the data to the snoop unit (operation 712). This operation may, in some embodiments, require a new form of snoop request that is not required in conventional inclusive policies. This snoop request is analogous to a write back in that the direction of dataflow is from the core cache outward, but, unlike a write back, does not include modified data.

Figure 8:
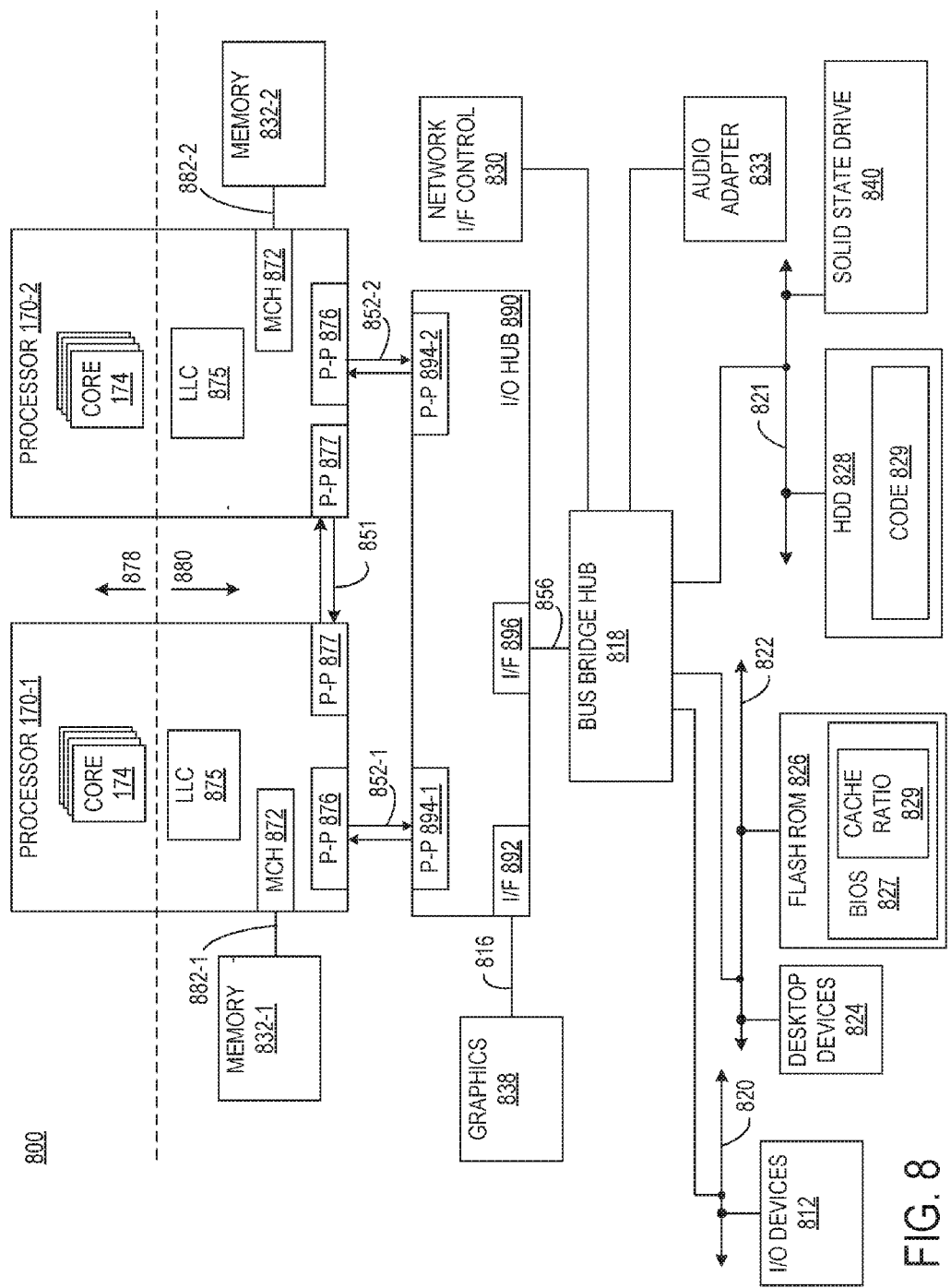
FIG. 8 illustrates one embodiment of a processing system.

Embodiments may be implemented in many different system types. FIG. 8 illustrates one embodiment of a processing system. In at least one embodiment, system 800 includes processors, memory, and input/output devices which are interconnected by a number of point-to-point (P-P) interfaces. However, in other embodiments processor system 800 may employ different bus architectures, such as a front side bus, a multi-drop bus, and/or another implementation. Although in some embodiments, system 800 includes multiple processors 170 and each processor 170 includes multiple processing cores 174, other embodiments may include multiple single core processors, a single multicore processor, or a single single-core processor.

In at least one embodiment, system 800 is a multiprocessor system that includes a first processor 170-1 and a second processor 170-2. In at least one embodiment, two processors 170 may be included. Other embodiments may include more or fewer processors. In at least one embodiment, processors 170 include a core region 878 and an integration region 880. In at least one embodiment, core region 878 includes one or more processing cores 174 and integration region 880 includes a memory controller hub (MCH) 872, an LLC 875, a processor-hub point-to-point interface 876, and a processor-processor point-to-point interface 877.

In some embodiments, processing cores 174 may each include hardware and firmware resources (not depicted) to support an execution pipeline. These resources may, in some embodiments, include a cache memory hierarchy, which may include a dedicated L1 instruction cache, a dedicated L1 data cache, an L2 data/instruction cache, or a combination thereof, prefetch logic and buffers, branch prediction logic, decode logic, a register file, various parallel execution resources including arithmetic logic units, floating point units, load/store units, address generation units, a data cache, and so forth.

In at least one embodiment, MCH 872 supports bidirectional transfer of data between a processor 170 and a system memory 832 via a memory interconnect 882. In some embodiments, system memory 832-1 may represent a bank of memory interfaces (or slots) that may be populated with corresponding memory devices, circuits, or boards. In at least one embodiment, system memory 832 may be a double-data rate (DDR) type dynamic random-access memory (DRAM) while memory interconnect 882 and MCH 872 may comply with a DDR interface specification.

In some embodiments, each processor 170 includes an MCH 872 to communicate with a portion of system memory 832 that is local to processor 170. In at least one embodiment, system memory 832-1 is local to processor 170-1 and represents a portion of the system memory 832 as a whole. In at least one embodiment, system 800 is a distributed memory multiprocessor system in which each processor 170 can access each portion of system memory 832, whether local or not. In some embodiments, while local accesses may have lower latency, accesses to non-local portions of system memory 832 are permitted.

In some embodiments, each processor 170 also includes a point-to-point interface 877 that supports communication of information with a point-to-point interface 877 of one of the other processors 170 via an inter-processor point-to-point interconnection 851. In some embodiments, processor-hub point-to-point interconnections 852 and processor-processor point-to-point interconnections 851 comply with a common set of specifications or protocols. In other embodiments, point-to-point interconnections 852 may represent a different transport than point-to-point interconnections 851.

In at least one embodiment, processors 170 include point-to-point interfaces 876 to communicate via point-to-point interconnections 852 with a point-to-point interface 894 of an I/O hub 890. In at least one embodiment, I/O hub 890 includes a graphics interface 892 to support bidirectional communication of data with a graphics adapter 838 via a graphics interconnection 816, which may be implemented as a high speed serial bus, e.g., a peripheral components interface express (PCIe) bus or another suitable bus.

In some embodiments, I/O hub 890 also communicates, via an interface 896 and a corresponding interconnection 856, with a bus bridge hub 818 that supports various bus protocols for different types of I/O devices or peripheral devices. In at least one embodiment, bus bridge hub 818 supports a network interface controller (NIC) 830 that implements a packet-switched network communication protocol (e.g., Gigabit Ethernet), a sound card or audio adapter 833, and a low bandwidth bus 822 (e.g., low pin count (LPC), 12C, Industry Standard Architecture (ISA)), to support legacy interfaces referred to herein as desktop devices 824 that might include interfaces for a keyboard, mouse, serial port, parallel port, and a removable media drive. In some embodiments, low bandwidth bus 822 further includes an interface for a nonvolatile memory (NVM) device such as flash read only memory (ROM) 826 that may store code for configuring a system following a reset or power transition, e.g., basic I/O system (BIOS) code 827. In some embodiments, a cache ratio indicator 829 indicative of a cache ratio illustrated in the preceding figures is loaded as part of a BIOS sequence and stored in a configuration register. In some embodiments, the value stored in cache ratio indicator 829 may indicate the actual ratio or may be a binary value indicating whether the numerical value exceeds a threshold value. In some embodiments, more than one value may be stored, with one value for each pair of cache memories to which the inclusion determination technique applies.

In at least one embodiment, a storage protocol bus 821 supported by bus bridge hub 818 may comply with any of various storage busses, e.g., a serial AT attachment (SATA) bus or a small computer system interface (SCSI) bus, to support persistent storage devices including conventional magnetic core hard disk drives (HDD) 828 to stored computer executable code 829, which may represent processor executable instructions including operating system instructions, application program instructions, and so forth, that, when executed by the processor, cause the processor to perform operations described herein. In some embodiments, system 800 also includes an "HDD-like" semiconductor-based storage resource referred to as solid state drive 840. In at least one embodiment, bus bridge hub 818 further includes a general purpose serial communication bus 820, e.g., a universal serial bus (USB), to support a variety of serial I/O devices 812. Although specific instances of communication busses and bus targets have been illustrated and described, other embodiments may employ different communication busses and different target devices.

Figure 9:
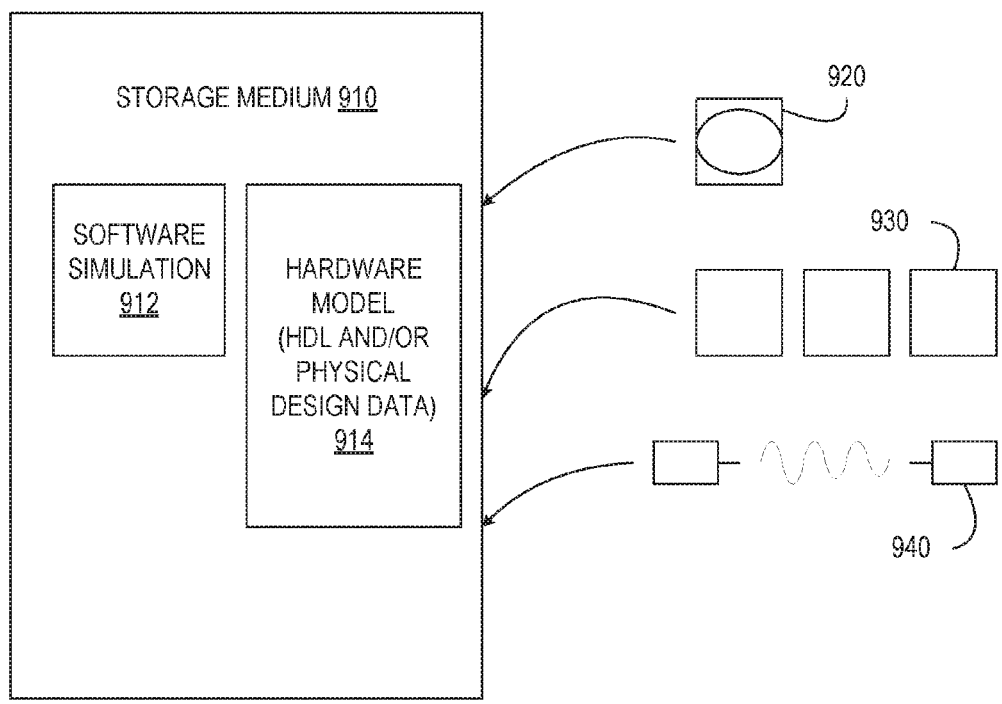
FIG. 9 illustrates a block diagram of selected elements of a representation for simulation, emulation and fabrication of a design for a processor.

FIG. 9 illustrates a block diagram of selected elements of a representation for simulation, emulation and fabrication of a design for a processor. Data representing a design may represent the design in a number of manners. First, as is useful in simulations, the hardware may be represented using a hardware description language or another functional description language which essentially provides a computerized model of how the designed hardware is expected to perform. In one embodiment, hardware model 914 may be stored in a storage medium 910 such as a computer memory so that the model may be simulated using simulation software 912 that applies a particular test suite to the hardware model 914 to determine if it indeed functions as intended. In some embodiments, the simulation software 912 is not recorded, captured or contained in the medium.

Additionally, in some embodiments, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In at least one embodiment, an optical or electrical wave 940 modulated or otherwise generated to transmit such information, a memory 930, or a magnetic or optical storage 920 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following pertain to further embodiments.

Embodiment 1 is a processor comprising: a processing core including a core cache; a large cache; and a cache controller to implement an inclusion policy, the cache controller comprising: a core eviction unit to update the large cache with a cache line subject to eviction from the core cache; and an M-state unit to send an M-state line to the core cache from the large cache and, responsive to a snoop request to read the M-state line, provide the M-state line.

In embodiment 2, the M-state unit included in the subject matter of embodiment 1 is optionally operable to responsive to a write back request, send the M-state line from the core cache to the large cache.

In embodiment 3, the snoop request to read the M-state line included in the subject matter of embodiment 1 optionally includes a request-for-ownership request.

In embodiment 4, the cache line subject to eviction from the core cache included in the subject matter of embodiment 1 optionally is the M-state line.

In embodiment 5, the subject matter of embodiment 1 can optionally include: a plurality of core caches, including a first core cache, and wherein the inclusion policy includes: designating a cache line stored in the first core cache as a shared-forward state responsive to storing the cache line in at least one other core cache, wherein the first core cache responds to a read request for the cache line by forwarding the cache line.

In embodiment 6, the inclusion policy included in the subject matter of embodiment 1 can optionally include responsive to detecting a flush operation in the core cache, forwarding all valid cache lines stored in the core cache to the large cache.

Embodiment 7 is a policy determination method comprising: (i) determining a cache ratio of a capacity of a large cache to a capacity of a core cache in a cache subsystem of a processor; (ii) selecting an inclusive policy as an inclusion policy for the cache subsystem in response to the cache ratio exceeding an inclusive threshold; (iii) selecting a non-inclusive policy as the inclusion policy for the cache subsystem in response to the cache ratio not exceeding the inclusive threshold; and (iv) responsive to a cache transaction resulting in a cache miss, performing an inclusive operation that invokes the inclusion policy.

In embodiment 8, the selecting of the inclusive policy included in the subject matter of embodiment 7 can optionally include selecting the inclusive policy in response to the cache ratio being less than a predetermined threshold value.

In embodiment 9, the predetermined threshold value included in the subject matter of embodiment 8 can optionally be approximately 1 to 5.

In embodiment 10, the selecting of the inclusive policy included in the subject matter of embodiment 9 can optionally include: implementing an inclusive eviction policy, wherein modified lines evicted from the core cache update the large cache and unmodified lines evicted from the core cache are evicted without updating the large cache; and implementing an inclusive modified line policy, wherein the large cache maintains ownership for the modified lines.

In embodiment 11, the selecting of the inclusive policy included in the subject matter of embodiment 7 can optionally include selecting the non-inclusive policy in response to the cache ratio exceeding a specified threshold value.

In embodiment 12, the selecting of the non-inclusive policy included in the subject matter of embodiment 11 can optionally include: implementing a non-inclusive eviction policy wherein all valid lines evicted from the core cache update the large cache; and implementing a non-inclusive modified line policy including: providing a modified line from the large cache to the core cache in response to a core cache miss that hits the modified line in the large cache; and providing a modified line in the core cache in response to detecting a snoop that hits to the modified line in the core cache.

In embodiment 13, the selecting of the non-inclusive policy included in the subject matter of embodiment 12 can optionally include implementing a clean data forwarding snooping policy comprising forwarding a clean line in the core cache in response to a snoop that hits to the clean line in the core cache.

In embodiment 14, the selecting of the non-inclusive policy included in the subject matter of embodiment 12 can optionally include responsive to a plurality of core caches each including a particular line, assigning an F-state to the particular line in one of the core caches; and responsive to an additional core cache accessing the particular line, providing the particular line to the additional core cache from the core cache in which the particular line has the F-state.

In embodiment 15, the selecting of the non-inclusive policy included in the subject matter of embodiment 12 can optionally include implementing a non-inclusive flush wherein a flush operation includes evicting all of the valid lines to the large cache.

In embodiment 16, the non-inclusive policy included in the subject matter of embodiment 7 can optionally include responsive to the core cache storing a cache line and the large cache not storing the cache line, responding to a snoop by forwarding the cache line to the large cache.

In embodiment 17, the processor included in the subject matter of embodiment 7 can optionally include a first core cache and the non-inclusive policy included in the subject matter of embodiment 7 can optionally include designating a cache line stored in at least two of the plurality of core caches including the first core cache as a shared-forward state in the first core cache, wherein the first core cache responds to a read request for the cache line by forwarding the cache line.

In embodiment 18, the non-inclusive policy included in the subject matter of embodiment 7 can optionally include responsive to detecting a flush operation in the core cache, forwarding all valid cache lines stored in the core cache to the large cache.

Embodiment 19 is a computer system comprising: a processor, comprising: a core cache; a large cache; and a cache controller to implement a non-inclusive policy based on a ratio of a capacity of the core cache to a capacity of the large cache, the cache controller comprising: a core eviction unit to update the large cache with a valid and clean cache line subject to eviction from the core cache; and a global M-state unit to send an M-state line to the core cache from the large cache, and, responsive to a request to read the M-state line, to send the M-state line from the core cache to the large cache; a memory controller, accessible to the processor; memory, accessible to the processor, via the memory controller; and an I/O hub, accessible to the processor, to provide I/O interfaces to communicate with I/O devices.

In embodiment 20, the cache controller included in the subject matter of embodiment 19 can optionally include a data forwarding unit to: responsive to detecting a flush operation in the core cache, forward all valid cache lines stored in the core cache to the large cache.

In embodiment 21, the subject matter of embodiment 19 can optionally include a plurality of processing cores, including a first processing core, having a respective plurality of core caches, to store a cache line and wherein the first processing core is operable to: designate the cache line stored in the first processing core cache as a shared-forward state responsive to storing the cache line in multiple core caches, wherein the first processing core cache responds to a read request for the cache line by forwarding the cache line.

In embodiment 22, the M-state unit included in the subject matter of embodiment 19 is optionally operable to responsive to a write back request, send the M-state line from the core cache to the large cache.

In embodiment 23, the request to read the M-state line included in the subject matter of embodiment 19 can optionally include a request-for-ownership request.

In embodiment 24, the valid and clean cache line subject to eviction from the core cache included in the subject matter of embodiment 19 can optionally include an M-state line.

In embodiment 25, the subject matter of any one of embodiments 1-4 can optionally include: a plurality of core caches, including a first core cache, and wherein the inclusion policy includes: designating a cache line stored in the first core cache as a shared-forward state responsive to storing the cache line in at least one other core cache, wherein the first core cache responds to a read request for the cache line by forwarding the cache line.

In embodiment 26, the selecting of the inclusive policy included in the subject matter of any one of embodiments 7-10 can optionally include selecting the non-inclusive policy in response to the cache ratio exceeding a specified threshold value.

In embodiment 27, the non-inclusive policy included in the subject matter of any one of embodiments 7-15, can optionally include responsive to the core cache storing a cache line and the large cache not storing the cache line, responding to a snoop by forwarding the cache line to the large cache.

In embodiment 28, the request to read the modified-state line included in the subject matter of any one of embodiments 19-22, can optionally include a request-for-ownership request.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor comprising:
    a first storage to store a cache ratio indicator indicative of a ratio of a capacity of a second cache to a capacity of a first cache;
    a core;
    the first cache;
    the second cache; and
    a cache controller including:
        a core eviction unit, in response to an eviction of a clean and valid cache line from the first cache and based at least in part on a value of the cache ratio indicator, to perform one of:
            an inclusive eviction operation to silently drop the clean and valid cache line from the first cache; and
            a non-inclusive eviction operation to update the second cache to include the clean and valid cache line; and
        a state unit, in response to a first cache miss of a targeted line, valid and modified line in the second cache and based at least in part on the value of the cache ratio indicator, to perform one of:
            a first inclusive modified operation to allocate a cache line in the first cache to store the targeted line in an exclusive state and fill the cache line in the first cache from the valid and modified line in the second cache; and
            a first non-inclusive modified operation to allocate a cache line in the first cache to store the targeted line in a modified state, forward the valid and modified line in the second cache to the cache line in the first cache, and invalidate the valid and modified line in the second cache.

2. The processor of claim 1, wherein the state unit, in response to a read for ownership (RFO) snoop request and based at least in part on the value of the cache ratio indicator, to perform one of:
    a second inclusive modified operation to disregard the RFO snoop request; and
    a second non-inclusive modified operation to access a tracking structure to determine whether the snoop hits and provide a line applicable to the RFO snoop request responsive to detection of an indication of the line in the tracking structure.

3. The processor of claim 1, wherein the cache controller includes a snoop unit, in response to a passive read snoop request that hits to a clean and valid line in the first cache and based at least in part on the value of the cache ratio indicator, to perform one of:
    an inclusive clean-forward operation to acknowledge the passive read snoop request; and
    a non-inclusive clean-forward operation to update the second cache to include the clean and valid cache line indicated in the passive read snoop request.

4. The processor of claim 1, wherein the cache controller includes a core flush unit, in response to a core flush instruction and based at least in part on the value of the cache ratio indicator, to perform one of:
    a non-inclusive flush operation to update the second cache to include valid lines in the first cache; and
    an inclusive flush operation to update to the second cache to include modified lines in the first cache.

5. The processor of claim 1, wherein the first cache comprises an intermediate level cache and the second cache comprises a last level cache.

6. A non-transitory machine-readable medium having stored thereon instructions, which if performed by a machine cause the machine to perform a method comprising:
    determining, via access to a configuration storage of a system including a processor, a cache ratio indicator indicative of a cache ratio of a capacity of a second cache to a capacity of a first cache; and
    performing, responsive to a cache transaction resulting in a cache miss, an operation selected, based at least in part on a value of the cache ratio indicator, from:
        an inclusive operation to preserve inclusivity between the first cache and the second cache; and
        a non-inclusive operation to preserve non-inclusivity between the first cache and the second cache.

7. The non-transitory machine-readable medium of claim 6, wherein performing the operation includes performing the inclusive operation responsive to the value of the cache ratio indicator exceeding a threshold value.

8. The non-transitory machine-readable medium of claim 7, wherein the inclusive operation is selected from:
    updating the second cache to include modified lines evicted from the first cache and silently dropping clean lines evicted from the first cache; and
    preventing a line in the first cache to be allocated in a modified state.

9. The non-transitory machine-readable medium of claim 6, wherein performing the operation includes performing the non-inclusive operation responsive to the value of the cache ratio indicator being less than the threshold value.

10. The non-transitory machine-readable medium of claim 9, wherein the non-inclusive operation is selected from:
    updating the second cache to include modified lines and clean lines evicted from the first cache;
    allocating a line in the first cache in a modified state based on the value of the cache ratio indicator; and
    providing a modified line in the first cache in response to a snoop transaction that hits to the modified line.

11. A processor comprising:
    a processing core including a core cache;
    a second cache; and
    a cache controller, responsive to a transaction that misses in the core cache and based at least in part on a value of a cache ratio indicator indicative of a ratio of a size of the second cache to a size of the core cache, to perform one of:

allocation of a core cache line to store in an exclusive state data of the transaction obtained from a valid and modified line in the second cache; and allocation of the core cache line to store in a modified state the data of the transaction obtained from the valid and modified line in the second cache and invalidation of the valid and modified line in the second cache.

12. The processor of claim 11, wherein the cache controller, responsive to an eviction of a clean and valid cache line from the core cache and based at least in part on the value of the cache ratio indicator, is to perform one of:

an inclusive eviction operation to silently drop the clean and valid cache line from the core cache; and a non-inclusive eviction operation to update the second cache to include the clean and valid cache line.

13. The processor of claim 12, wherein the core cache, responsive to a read for ownership (RFO) snoop request and based at least in part on the value of the cache ratio indicator, to perform one of:

a second inclusive modified operation to disregard the snoop request; and a second non-inclusive modified operation to access a tracking structure to determine whether the snoop hits and to provide a line applicable to the snoop request responsive to detection of an indication of the line in the tracking structure.

14. The processor of claim 12, wherein the cache controller, responsive to a passive read snoop request that hits to a clean and valid line in the core cache and based at least in part on the value of the cache ratio indicator, to perform one of:

an inclusive clean-forward operation to acknowledge the snoop request; and a non-inclusive clean-forward operation to update the second cache to include the clean and valid line indicated in the snoop request.

15. The processor of claim 12, wherein the cache controller, responsive to a core flush instruction and based at least in part on the value of the cache ratio indicator, to perform one of:

a non-inclusive flush operation to update the second cache to include valid lines in the core cache; and an inclusive flush operation to update the second cache to include modified lines in the core cache.

16. The processor of claim 12, wherein the processing core includes a level one instruction cache, a level one data cache, and an intermediate level cache.

17. The processor of claim 16, wherein the core cache comprises the intermediate level cache and the second cache comprises a last level cache.

18. The processor of claim 12, further comprising a plurality of processing cores, each processing core including a core cache, and wherein the second cache is a shared cache shared by the plurality of processing cores.

19. The processor of claim 18, wherein the shared cache comprises a last level cache.

* * * * *